(12) United States Patent
Michel et al.

(10) Patent No.: US 7,744,393 B2
(45) Date of Patent: Jun. 29, 2010

(54) CODABLE MOTOR CONNECTOR

(75) Inventors: Markus Michel, Nagold (DE); Gerhard Wehrle, Donaueschingen (DE)

(73) Assignee: CONINVERS GmbH, Herrenberg (DE)

( * ) Notice: Subject to any disclaimer, the term of this patent is extended or adjusted under 35 U.S.C. 154(b) by 0 days.

(21) Appl. No.: 12/417,833

(22) Filed: Apr. 3, 2009

(65) Prior Publication Data

US 2009/0251015 A1    Oct. 8, 2009

(30) Foreign Application Priority Data

Apr. 4, 2008    (DE)    ................... 20 2008 004 766 U

(51) Int. Cl.
*H02K 21/00*    (2006.01)

(52) U.S. Cl. ........................ 439/189; 310/71

(58) Field of Classification Search ................. 539/189, 539/221, 222, 507, 511; 310/71
See application file for complete search history.

(56) References Cited

U.S. PATENT DOCUMENTS

| | | | |
|---|---|---|---|
| 2,321,999 A | | 6/1943 | Dalton |
| 2,507,242 A | | 5/1950 | Bost |
| 2,552,028 A | * | 5/1951 | Blair ............................ 310/71 |
| 3,602,748 A | * | 8/1971 | Locke .......................... 310/71 |
| 3,917,371 A | * | 11/1975 | Hirokawa et al. ............. 439/52 |
| 4,429,935 A | | 2/1984 | Lamb et al. |
| 4,748,355 A | | 5/1988 | Anderson et al. |
| 4,781,610 A | | 11/1988 | Mercer |
| 4,880,391 A | | 11/1989 | Hurtgen |
| 5,007,888 A | * | 4/1991 | Goutiere ...................... 439/189 |
| 5,061,196 A | * | 10/1991 | Weston et al. ................ 439/189 |
| 5,581,137 A | * | 12/1996 | Lundquist et al. ........... 310/68 R |
| 6,048,219 A | * | 4/2000 | Kotowski .................... 439/221 |

| | | |
|---|---|---|
| 6,280,233 B1 | 8/2001 | Beege et al. |

(Continued)

FOREIGN PATENT DOCUMENTS

DE    39 34 981    3/1991

(Continued)

OTHER PUBLICATIONS

European Search Report for corresponding application No. 09 00 4239 dated Jul. 1, 2009.

*Primary Examiner*—Neil Abrams
(74) *Attorney, Agent, or Firm*—Renner, Otto, Boisselle & Sklar, LLP

(57) ABSTRACT

The invention concerns a motor connector for supplying voltage to a polyphase motor, with a connector housing that contains a number of electrically conductive pass-through elements whose number matches the number of electrical supply lines to be connected. By means of said pass-through elements, the supply lines can be connected electrically to contacts of a connecting plug mounted on the outside of a motor hosing of the polyphase motor, said contacts being connected to the winding conductors of the motor. The operating mode of the motor in delta or star connection can be selected by internal bridge configuration of the pass-through elements. For this purpose, the connector housing has a coding section that is separated from the connection section for the supply lines, with the coding section preferably designed as an enclosed coding chamber so that the connection section forms a connection chamber that is separated from the coding chamber. The bridge configuration is designed as an internal plug connection and is performed by means of a coding plug.

10 Claims, 4 Drawing Sheets

U.S. PATENT DOCUMENTS 6,746,279 B1 * 6/2004 Lopez .................. 439/620.01
6,991,496 B2 * 1/2006 Kuribayashi et al. ... 439/620.04

FOREIGN PATENT DOCUMENTS

| | | | |
|---|---|---|---|
| DE | 299 15 512 | | 1/2001 |
| DE | 203 01 077 | | 4/2003 |
| DE | 103 60 547 | | 3/2005 |
| EP | 0 633 626 | | 1/1995 |
| GB | 2147156 | * | 5/1986 |
| GB | 2 435 554 | | 8/2007 |

* cited by examiner

CODABLE MOTOR CONNECTOR

CROSS-REFERENCE TO RELATED APPLICATION

The present application claims priority under 35 USC §119 to German Patent Application No. 20 2008 004 766.8, filed on Apr. 4, 2008, the entire disclosure of which is incorporated herein by reference.

TECHNICAL FIELD OF THE INVENTION

The invention concerns a motor connector for supplying voltage to a polyphase motor, with a connector housing that contains a number of electrically conductive pass-through elements whose number matches the number of electrical supply lines to be connected, wherein, by means of said pass-through elements, the supply lines can be connected electrically to contacts of a connecting plug mounted on the outside of a motor housing of the polyphasep motor, said contacts being connected to the winding conductors of the motor.

DESCRIPTION OF THE RELATED ART

With many devices consuming electricity, the correct operation and the electrical safety depend on their correct connection to the power supply. This is especially true for devices consuming rotary current, for example polyphase motors where the direction of rotation and the power are determined by the type of connection. Known types of connection for polyphase motors are the delta and the star connection where the three motor windings are connected either in series or at one end. In a delta connection, a three-conductor system is used for supplying electric energy to the polyphase motor, and a four-conductor system is used for the star connection, with the supply lines to be connected in a certain sequence to the motor windings that were previously connected to each other in the desired type of connection. Here, the direction of rotation of the motor depends on the selected sequence of the supply lines, and its power depends on the selected type of connection.

Polyphase motors are available from the manufacturer or dealer either pre-configured, re-configurable, or unconfigured for the various type of operation. Unconfigured motors, or those that are pre-configured but can be changed, reduce the variety of types of motors that need to be manufactured and kept in stock, thereby reducing the associated costs.

It is common practice to determine the type of operation by bridge configuration at a connection and/or connecting terminal block of the polyphase motor that is mechanically fixed on the housing of the motor and permanently connected electrically to the motor windings. Usually, the terminal blocks are housed in a motor connection box. To simplify the bridge configuration, bridging combs or connecting rails are known that can be inserted into the terminal block. As an example, reference is made to the design patent DE 203 01 077 U1 and the patent disclosure DE 39 34 981 A1. Different bridging combs or connecting rails are required for the delta and the star connection.

Due to space limitations, the terminal blocks of drive motors are frequently difficult to access after the polyphase motor has been mounted on a machine frame. This makes the bridge configuration unnecessarily more difficult when the motor must subsequently be electrically connected to the unit and the type of operation must be selected. Connecting the electrical supply lines to the terminals is time-consuming. As simplification, it is common practice in the field to design the connecting terminals as motor connecting plug with a number of contacts into which a connector with sockets can be inserted. The electrical power supply lines enter the connector and are connected to the sockets in the required sequence. In case of defects associated with the electric motor or to perform maintenance requiring the removal of the motor, this permits the easy and quick disconnection or safe re-connection of the electrical connections of the motor.

SUMMARY OF THE INVENTION

The invention addresses the problem of proposing a different method that would allow the easy and safe implementation of the required connection variants of the motor windings even when access is limited following the installation of a polyphase motor.

The plug connector housing of the plug connector according to the invention has a coding section that is separated from a connection section. In said coding section, the operating mode of the motor in a delta or star connection can be selected by internal bridge configuration of electrically conductive pass-through elements. In the plug connector housing, the pass-through elements are provided in a number that matches the number of the electrical supply lines to be connected so that, by means of each of the pass-through elements, an electrical connection of the supply lines can be made to an associated contact of a connecting plug that is mounted on the outside of a motor housing of the polyphase motor. The contacts of the connecting plug are connected to the winding conductors of the motor.

In an advantageous embodiment, the coding section is implemented as an enclosed coding chamber so that the connection section forms a connections chamber that is separated from the coding chamber.

This has the advantage that no work of any kind needs to be performed on the motor itself in order to select the mode of operation and the direction of rotation of the polyphase motor. All measures necessary for this can be performed exclusively on the plug connector in the connection and/or coding chamber. In principle, the steps can be performed when the plug connector is connected to the connecting plug of the motor or is disconnected from it. In each case, the supply lines must first be disconnected from the line power. Of course, the bridge configuration and the connection of the electrical supply lines become easier when the plug connector is disconnected from the connecting plug.

Advantageously, the bridge configuration takes the form of an internal plug connection that is made in the coding chamber. The bridging of certain pass-through elements is performed preferably by means of stamped and/or bent wire and/or stamped and bent parts serving as bridging elements that are prefabricated in an appropriate grid dimension and are included with the plug connector. This makes it possible in a simple way to establish electrical contact quickly and positively between the pass-through elements that are to be connected to each other. This also allows a quick and unproblematic change of the operating mode.

In one embodiment of the invention, the internal plug connection has a coding plug. In this coding plug, the bridging elements for one particular operating mode are combined, which further simplifies and accelerates the coding as a delta or star connection. Preferably, the bridging elements are embedded in a plastic carrier that can also prevent using the wrong polarity with respect to the pass-through elements.

It fits the purpose if the pass-through elements are made as stamped and bent parts and have sockets that are engaged by the contacts of the connecting plug and of the internal coding plug. Preferably, the pass-through elements are made of a flat strip-type material. The sockets for the contacts point in the plug-in direction of the plug connector while the sockets for the coding plug are aligned in the direction of the coding chamber.

In one embodiment of the plug connector according to the invention, each of the pass-through elements has a spring terminal for attaching the electrical supply lines. The spring terminals are actuated via a terminal plunger that projects into the connection chamber, which makes it especially easy to connect the supply lines to or disconnect them from the pass-through elements.

In order to select the direction of rotation of the polyphase motor, the supply lines must be connected to certain pass-through elements of the plug connector in the correct sequence. To change the direction of rotation, it is merely necessary to switch two of the supply lines in the connection chamber, which can be done quickly and without problems by means of the spring terminals.

In an advantageous embodiment of the invention, the coding chamber preferably has a removable coding chamber cover that covers the sockets for the coding plugs and/or the bridging elements and/or the coding plug, thereby protecting them against damage. It is made of an insulating material and protects people from making contact with possibly live components during installation and maintenance work.

It offers special advantages if the connector housing is equipped with a connector housing cover that is pivotably attached. The cover can be swiveled away laterally from the connector housing so that the connection sector or the connection chamber and the coding section or the coding chamber become accessible. In addition, it is equipped with a safety device that prevents unintended opening of the closed housing cover. Ideally, the connector housing cover is hinged at that side of the connector housing that faces away from the motor so that the housing cover can be opened and swiveled even when the plug connector and the connecting plug of the motor are connected to each other.

Preference is given to an embodiment of the plug connector wherein the connector housing is composed of a front and a rear connector housing section that are joined by means of a swivel joint that is oriented transversely to the plug-in direction of the plug connector. It fits the purpose if the swivel joint is arranged on that side of the connector housing that faces the motor in such a way that, in relation to the front connector housing section, the rear connector housing section can be swiveled in the direction of the motor by up to 90 degrees or more.

As a result, the plug connector according to the invention permits the complete programming of the motor exclusively on or in the plug connector. On the one hand, the operating mode of the motor as star/delta can selected therein, with the option of making it accessible or inaccessible. On the other hand, the direction of rotation of the motor can be chosen easily by switching two phases by means of the spring terminals. All changes can be performed with ease due to the good accessibility offered by the pivoting connector housing cover, even under difficult installation conditions in the manufacturing facilities.

In the following, the invention is explained in detail with reference to an embodiment shown in the drawing. Additional characteristics of the invention are given in the following description of the embodiment of the invention in conjunction with the claims and the attached drawing. The individual characteristics of the invention can be implemented by themselves or in combinations of several in different embodiments of the invention.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
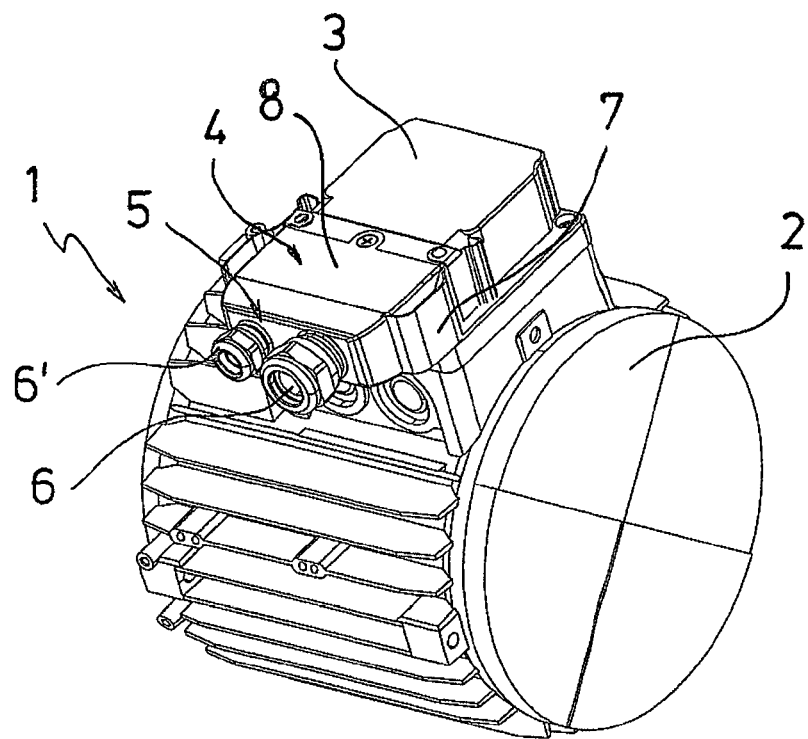
FIG. 1 shows a perspective view of a polyphase motor with connecting plug and with a plug connector according to the invention that is connected to the connecting plug.

FIG. 1 shows a polyphase motor 1 with a motor housing 2 to which a connecting plug 3 is attached on the outside. Contacts (not visible in FIG. 1) of the connecting plug 3 are connected in an electrically conductive way to the winding conductors of the motor 1. Power is supplied to the polyphase motor 1 via a plug connector 4 according to the invention, with the connecting plug 3 and the plug connector 4 being plugged together. The plug connector 4 can be connected to mains power by means of electric supply lines (not shown in the figure). In order to insert the supply lines, the plug connector 4 at a rear end 5 has two cable bushings 6, 6', with the cable bushing 6 intended for the power cable and the cable bushing 6' for a control cable. The plug connector 4 and the connecting plug 3 are locked together by means of two locking clips 7 that are arranged laterally on a connector housing 8 of the plug connector 4. The clips 7 are spring-action clips and are swivelably attached to the connector housing 8. They engage grooves in the connecting plug 3 and in the plug connector 4.

Figure 2:
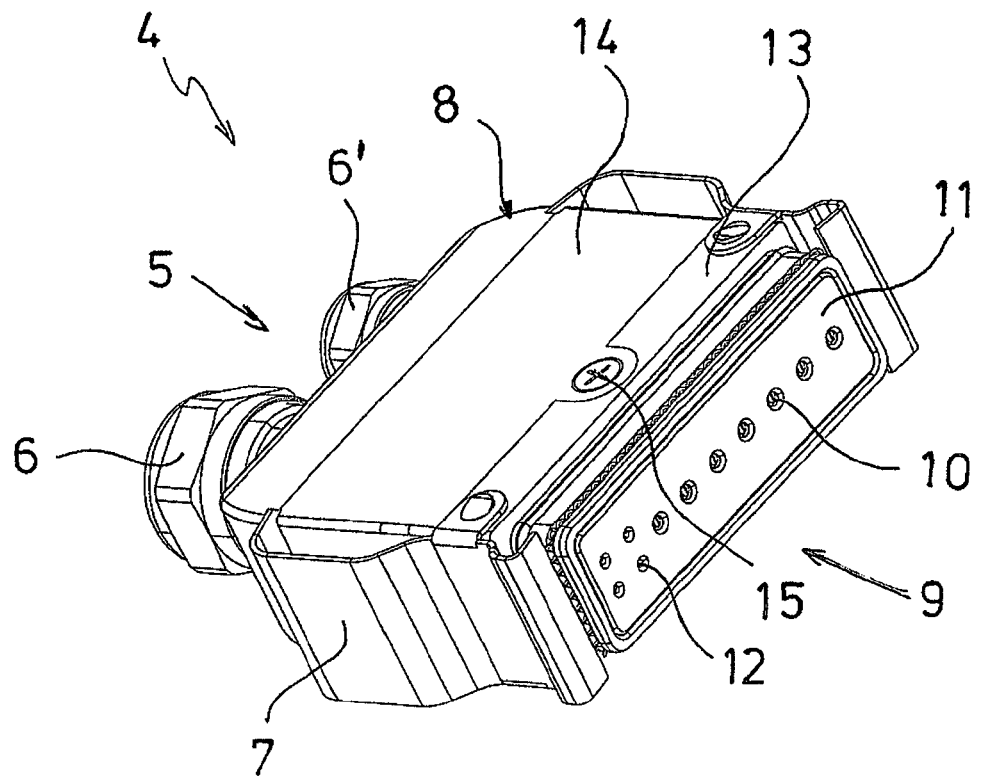
FIG. 2 shows a view of the plug-in side of the plug connector from FIG. 1.

FIG. 2 shows the plug connector 4 according to the invention without the motor 1 shown in FIG. 1, in a view of the front end 9 that is associated with the connecting plug 3. The design of the front end 9 is complementary to the plug-in side of the connecting plug 3 and has seven pass-through elements 10 in an insulating body 11. Via the pass-through elements 10 the power supply lines are connected directly to the winding conductors of the motor 1 after the plug connector 4 is plugged into the connecting plug 3. In addition to the seven pass-through elements 10 that are arranged in a row and serve to supply power to the motor, additional pass-through elements 12 outside of the row are provided in the insulating body 11; they may be used for a speed sensor or other control devices or instruments, for example. The connector housing 8 is made of metal and may therefore serve as a pass-through element for the ground conductor.

The connector housing 8 consists of two parts. It consists of a first, front housing section 13 that is followed by a second, rear housing section 14; both are connected to each other by means of a swivel joint. In the description of the figures below, the front housing section 13 is referred to as a connector housing body 13, and the rear housing section 14 is referred to a connector housing cover 14. When the connector housing cover 14 is closed, a locking screw 15 prevents the connector housing cover 14 from swiveling away from the connector housing body 13.

Figure 3:
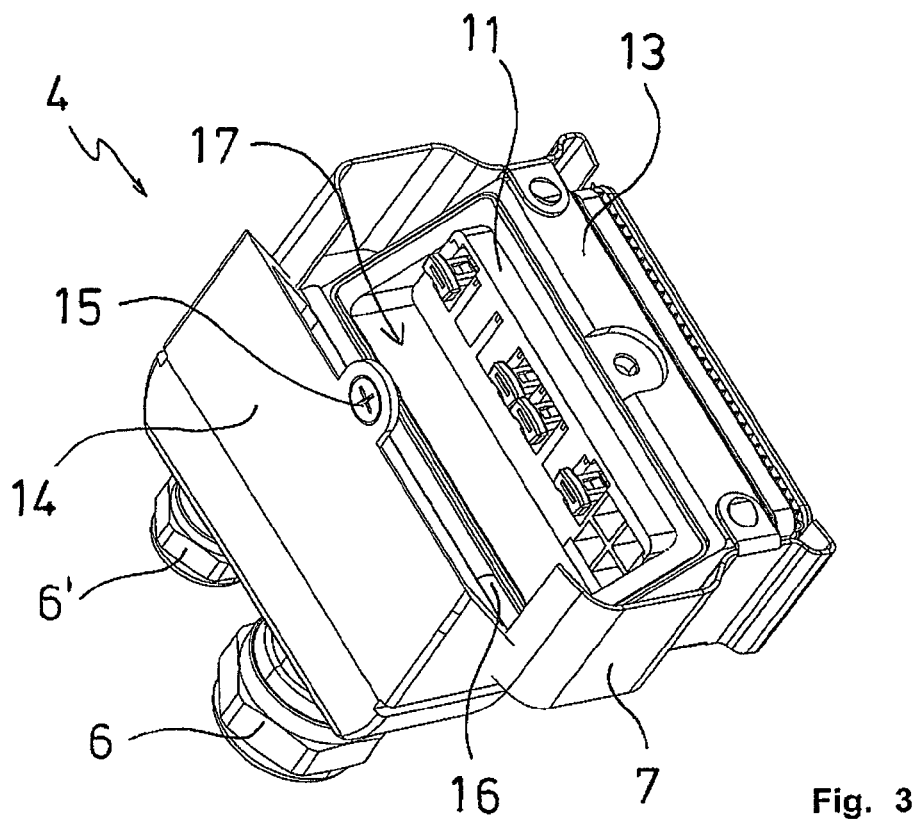
FIG. 3 shows the connector from FIG. 2 with the plug connector housing cover swiveled open, with a view of the connection chamber.

FIG. 3 shows the plug connector 4 with opened connector housing cover 14. The connector housing cover 14 that is connected to the connector housing body 13 by means of a swivel joint 16, is swiveled by approximately 90 degrees relative to the connector housing body 13, thereby providing free access to a connection chamber 17 of the plug connector 4. The power supply lines (not shown in FIG. 3) reach the connecting chamber 17 via the cable bushings 6, 6' that are located at a rear end 5 of the connector housing cover 14. When passing through the cable bushings 6, 6', the shielding of the power cable containing the supply lines can be connected in an electrically conductive way to the connector housing 8 by means of iris contacts, as is common practice. When the connector housing cover 14 is in its swiveled position of 90 degrees, the contact of the shielding by means of the iris can be checked and reliably established.

With its connection side, the insulating body 11 with the pass-through elements 10, 12 projects into the connection chamber 17 of the connector housing 8. The supply lines (not shown) are connected to the pass-through elements 10, 12 by means of plug or terminal connections. The insulating body 11 is held non-permanently in the connector housing 8. It can be removed from the connector housing body 13, preferably in the forward direction, in order to be able to select the operating mode of the motor 1 in delta or star connection by means of internal bridge configuration. After the configuration is completed, it is simple to insert it again in the opposite direction into the connector housing body 13 of the connector housing 8. For this purpose, a locking device may be provided that can only be unlocked with an unlocking tool in order to allow coding changes to be performed by authorized personnel only.

Figure 4:
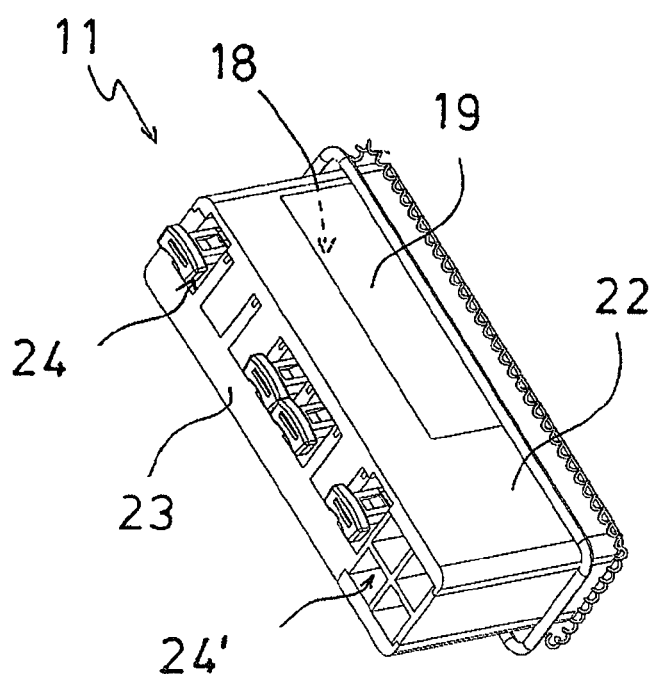
FIG. 4 shows the insulating body of the plug connector according to the invention holding pass-through elements, with a view of the connection side.
Figure 5:
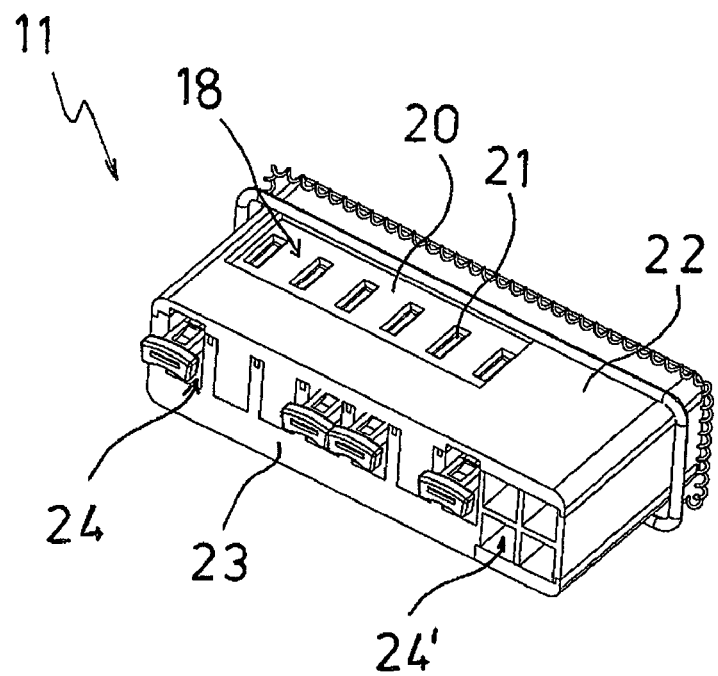
FIG. 5 shows the insulating body from FIG. 4 with opened coding chamber.
Figure 6:
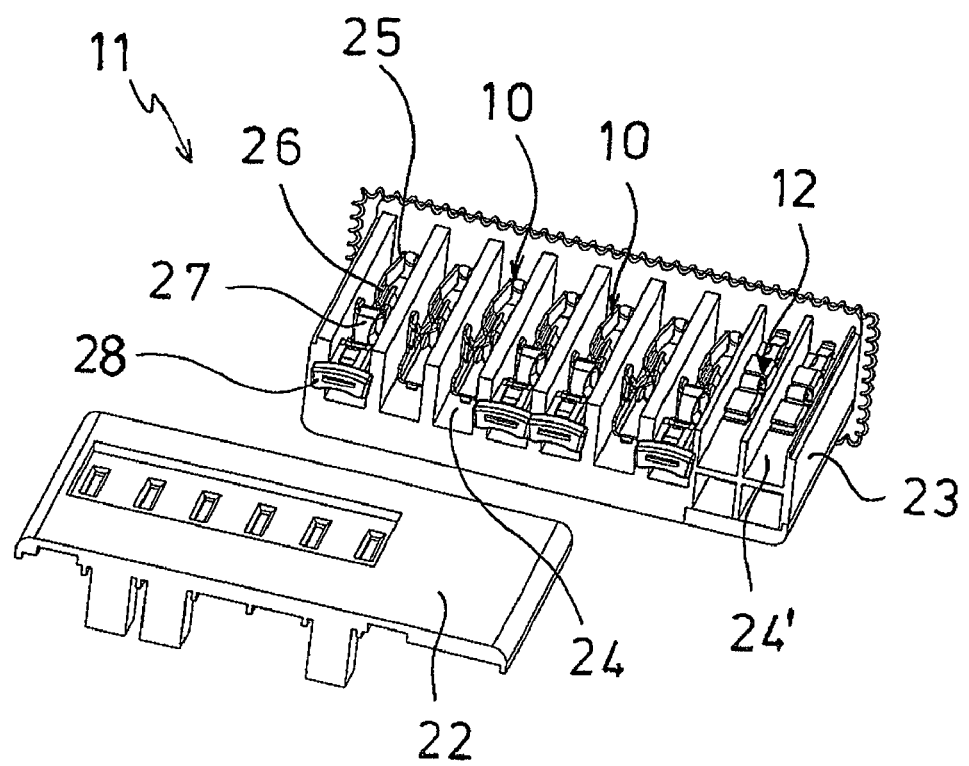
FIG. 6 shows the insulating body from FIG. 5 with the upper part removed.
Figure 7:
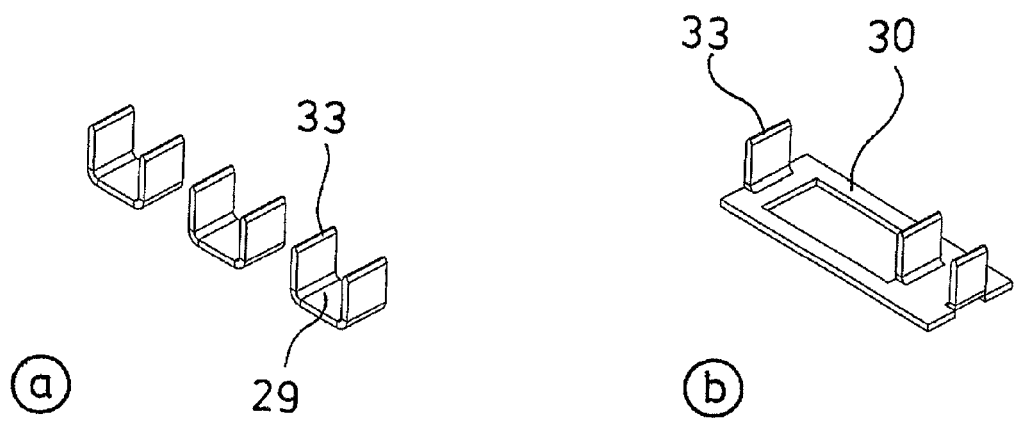
FIG. 7 shows first bridging elements for a delta connection and second bridging elements for a star connection for the bridge configuration of the pass-through elements of the connector according to the invention.

FIGS. 4, 5 show the insulating body 11, composed of an upper insulating body 22 and a lower insulating body 23, without the connector housing 8. The insulating body 11 has interior chambers 24, 24' that hold the pass-through elements 10, 12, as shown in FIG. 6. The bridge configuration of the pass-through elements 10 located in the chambers 24 is performed in a coding chamber 18 that is provided beneath a coding chamber cover 19 of the insulating body 11. FIG. 4 shows the insulating body 11 with the coding chamber cover 19 placed on the upper insulating body part 23, and FIG. 5 shows the insulating body 11 with the coding chamber cover 19 removed from the insulating body. FIG. 5 shows the open coding chamber 18 with the cover 19 placed next to it, with the cover 19 designed for easy installation and removal so that the bridge configuration can be performed. On one bottom 20 of the coding chamber 18, insertion openings 21 are provided for bridging elements (not shown in this Figure) for six of the seven pass-through elements 10 that are visible in FIG. 6. FIG. 7 shows these bridging elements as bridging elements 29, 30.

FIG. 6 shows the insulating body 11 with the upper insulating body part 22 removed from the lower insulating body part 23. The side-by-side chambers 24, 24' of the lower insulating body part 23 contain the pass-through elements 10,12 as stamped and bent parts made of a flat conductive material. The pass-through elements 10 for supplying power to the motor 1 have first sockets 25 for the contacts of the motor connecting plug 3 shown in FIG. 1, and second sockets 26 for the bridging elements 29, 30 shown in FIGS. 7, 8. In order to connect the electrical supply lines, which is done to the connector housing 8 open as per FIG. 3 and the insulating body 11 located inside it, spring terminals 27 that can be actuated by terminal plungers 28 are provided on certain pass-through elements 10. Depending on the operating mode, the remaining pass-through elements 10 without spring terminals are connected electrically to one or more of the other pass-through elements 10 that have a spring terminal 27 via the bridging elements 29, 30 in the coding chamber 18.

For the delta and the star connection, different bridging elements 29, 30 are required that are shown in FIG. 7. As FIG. 7a shows, for the delta connection, three identical U-shaped bridging elements 29 are needed, each of which can connect two adjacent pass-through elements 10. As shown in FIG. 7b, a single bridging element 30 is required for the star connection that connects three pass-through elements 10 to each other. The bridging elements 29, 30 are made as stamped and bent parts and have tabs 33 for engaging the sockets 26 visible in FIG. 6.

Figure 8:
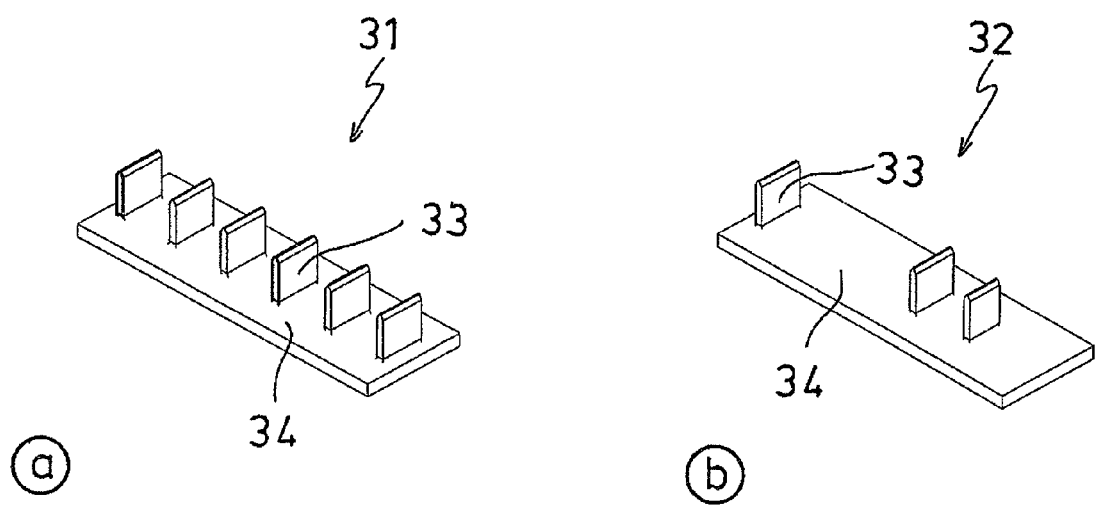
FIG. 8 shows a first coding plug for a delta connection and a second coding plug for a star connection to the bridging elements from FIG. 7.

As can be seen in FIG. 8, in order to make for easier handling, the bridging elements 29 or 30 are integrated in a coding plug 31 for the delta connection and a coding plug 32 for the star connection. For this purpose, except for the tabs 33, they are embedded in a plastic carrier 34, as shown in FIGS. 8a, b.

Further features of the invention can be found in the description of preferred embodiments of the invention in connection with the claims and the drawings. The single features can be realised alone or several together in embodiments of the invention.

The invention claimed is:

1. A motor connector for supplying voltage to a polyphase motor, with a connector housing that contains a number of electrically conductive pass-through elements whose number matches the number of electrical supply lines to be connected, wherein, by means of each of said pass-through elements, the supply lines can be connected electrically to an associated contact of a connecting plug mounted on the outside of a motor housing of the polyphase motor, said contact being connected to one of the winding conductors of the motor, wherein the connector housing has a coding section that is separated from the connection section and wherein the operating mode of the motor in delta or star connection can be selected by means of internal bridge configuration of the pass-through elements.

2. The plug connector as claimed in claim 1, wherein the coding section is designed as an enclosed coding chamber so that the connection section forms a connection chamber that is separated from the coding chamber.

3. The plug connector as claimed in claim 1, wherein the bridge configuration is designed as an internal plug connection.

4. The plug connector as claimed in claim 3, wherein the internal plug connection has a coding plug.

5. The plug connector as claimed in claim 1, wherein the pass-through elements are manufactured as stamped and bent parts and have sockets to be engaged by the contacts of the connecting plug and of the internal coding plug.

6. The plug connector as claimed in claim 1, wherein the pass-through elements have a spring terminal for the electrical supply lines.

7. The plug connector as claimed in claim 1, wherein the coding chamber has a removable coding chamber cover.

8. The plug connector as claimed in claim 1, wherein the connector housing has a connector housing cover for the connection chamber that is swivelably attached.

9. The plug connector as claimed in claim 8, wherein the connector housing is composed of a front connector housing section and a rear connector housing section that are connected to each other by means of a swivel joint that is oriented transversely to the plug-in direction of the plug connector in such a way that the rear connector housing section can be swiveled by approximately 90 degrees or more relative to the front connector housing section.

10. The plug connector as claimed in claim 2, wherein the bridge configuration is designed as an internal plug connection.

* * * * *